(12) United States Patent
Shannon

(10) Patent No.: US 8,376,385 B2
(45) Date of Patent: Feb. 19, 2013

(54) HALF ROUND TRAILER WITH LOWER CENTER OF GRAVITY

(75) Inventor: Danny R. Shannon, Tallmadge, OH (US)

(73) Assignee: Mac Trailer Manufacturing, Inc., Alliance, OH (US)

(*) Notice: Subject to any disclaimer, the term of this patent is extended or adjusted under 35 U.S.C. 154(b) by 711 days.

(21) Appl. No.: 12/229,300

(22) Filed: Aug. 21, 2008

(65) Prior Publication Data

US 2009/0322058 A1 Dec. 31, 2009

Related U.S. Application Data

(60) Provisional application No. 61/133,320, filed on Jun. 27, 2008.

(51) Int. Cl.
*B62D 53/06* (2006.01)

(52) U.S. Cl. ........................................................ 280/433

(58) Field of Classification Search .................. 280/433, 280/514, 441.2
See application file for complete search history.

(56) References Cited

U.S. PATENT DOCUMENTS

| | | | | | |
|---|---|---|---|---|---|
| 3,887,251 | A | * | 6/1975 | McKay | 384/421 |
| 4,457,531 | A | * | 7/1984 | Hunger | 280/433 |
| 4,946,184 | A | * | 8/1990 | Larocco | 280/433 |
| 5,066,035 | A | * | 11/1991 | Athans et al. | 280/441.1 |
| 5,890,728 | A | * | 4/1999 | Zilm | 280/433 |
| 6,186,530 | B1 | * | 2/2001 | Zilm | 280/496 |
| 7,000,937 | B2 | * | 2/2006 | Dick | 280/416.1 |
| 7,451,995 | B2 | * | 11/2008 | Bloodworth et al. | 280/433 |
| 2005/0082787 | A1 | * | 4/2005 | Dick | 280/415.1 |
| 2005/0253361 | A1 | * | 11/2005 | Bouwkamp | 280/441.2 |
| 2007/0069500 | A1 | * | 3/2007 | Bloodworth et al. | 280/433 |
| 2008/0042398 | A1 | * | 2/2008 | Mater et al. | 280/474 |

* cited by examiner

*Primary Examiner* — Tashiana Adams
(74) *Attorney, Agent, or Firm* — Sand & Sebolt

(57) ABSTRACT

A trailer including a body having a cavity formed by an upper surface and a lower surface, at least a portion of a coupling assembly disposed within the cavity and having a reinforcement plate proximate the lower surface, a distribution plate, at least one support beam, and a top plate, wherein the distribution plate is disposed atop the reinforcement plate, the at least one support beam is disposed atop the distribution plate, and the top plate is disposed atop the at least one support beam.

31 Claims, 11 Drawing Sheets

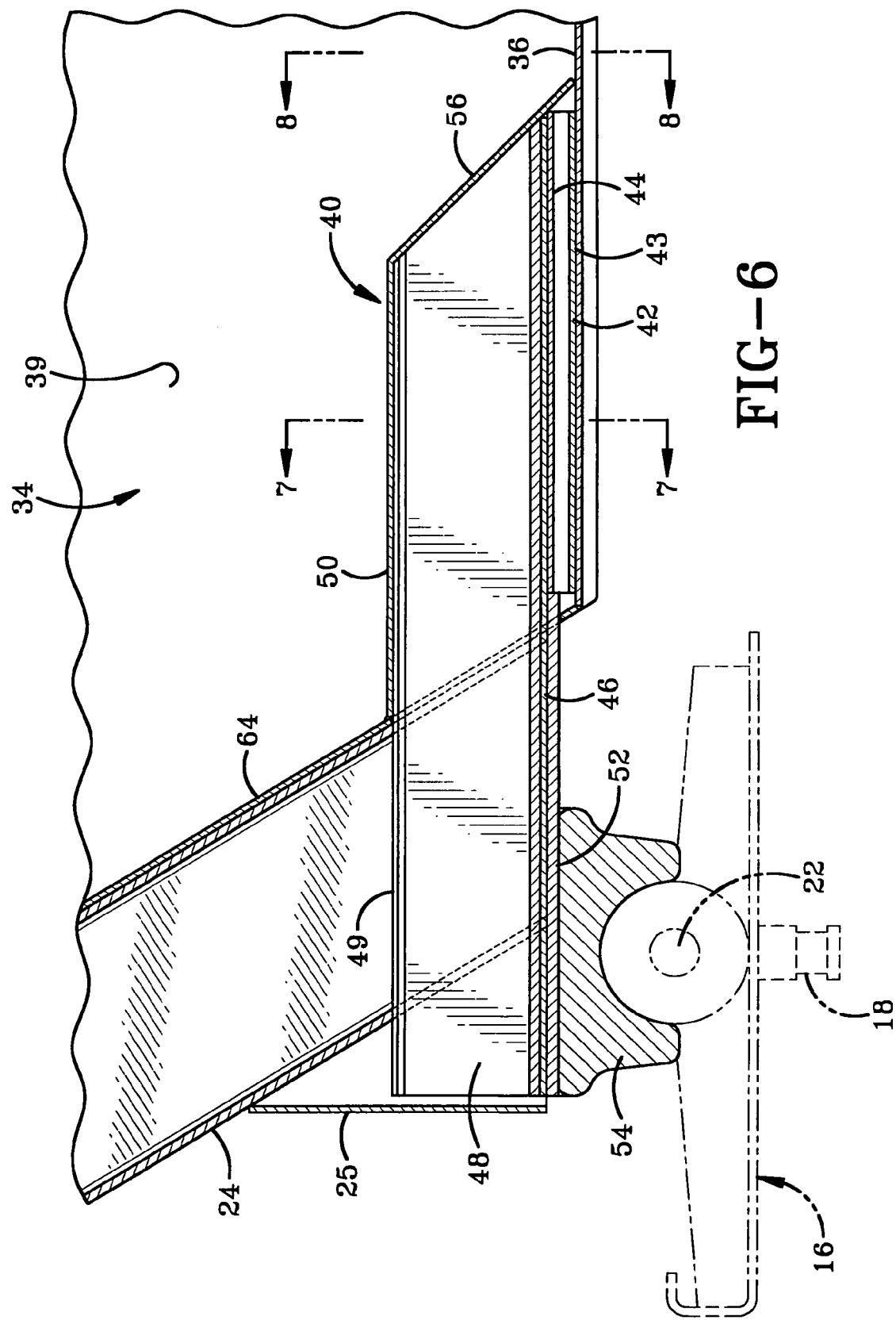

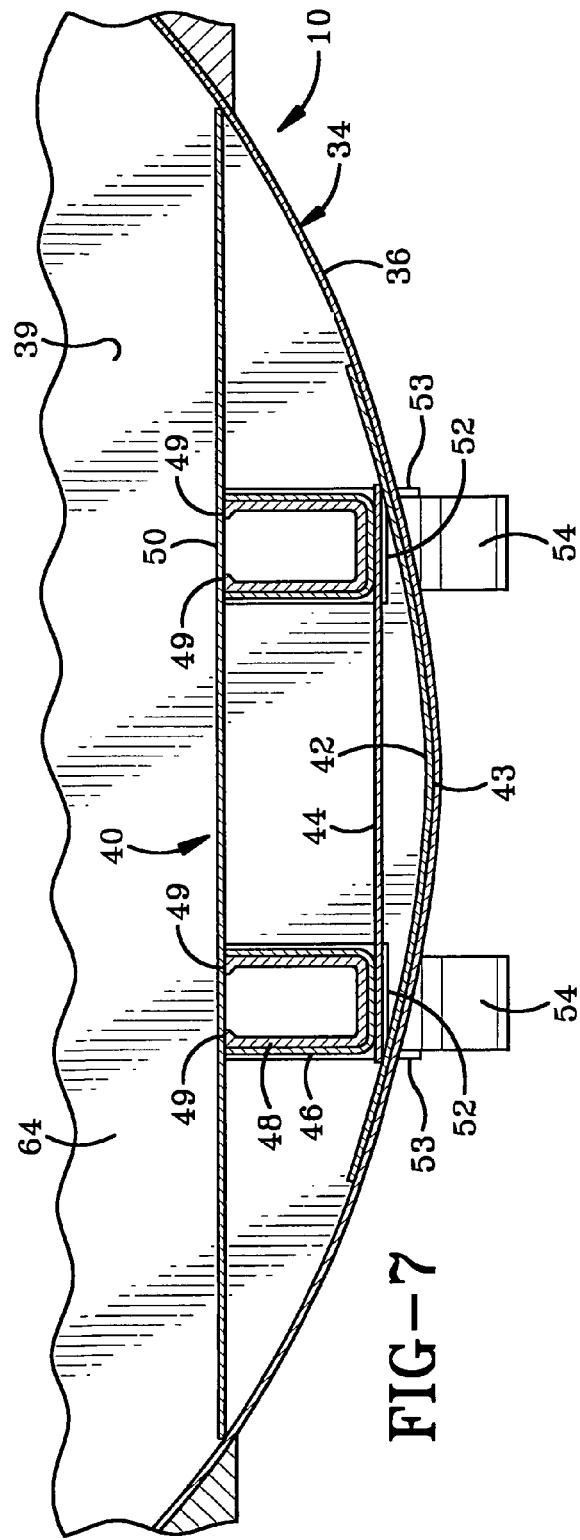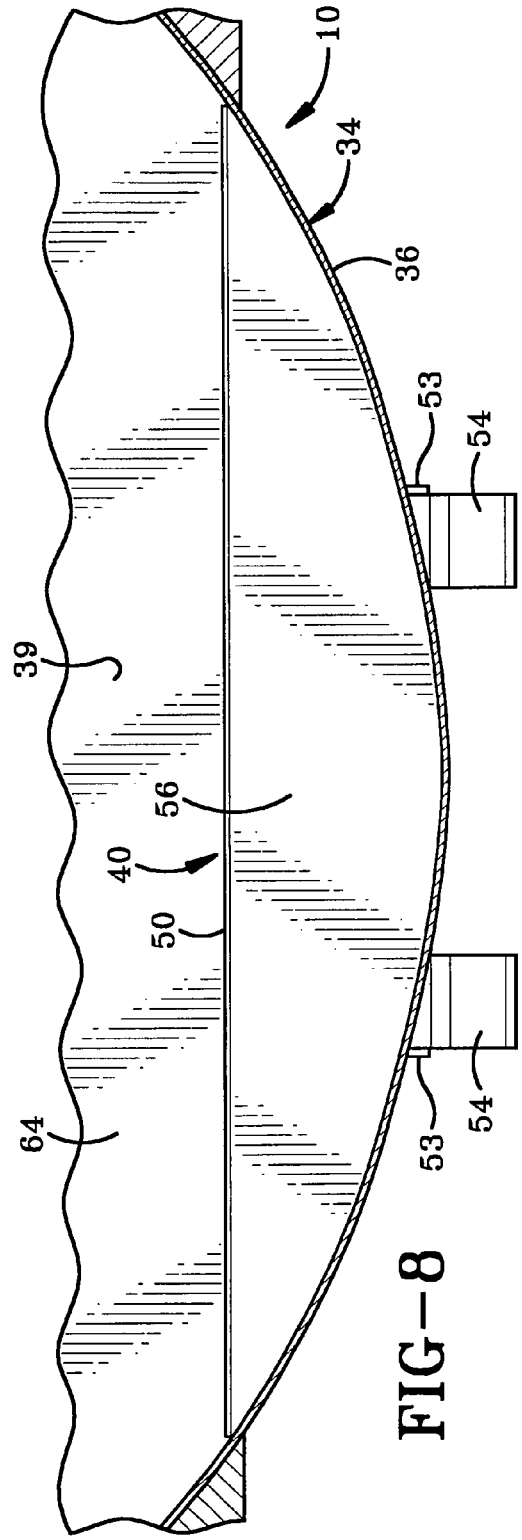

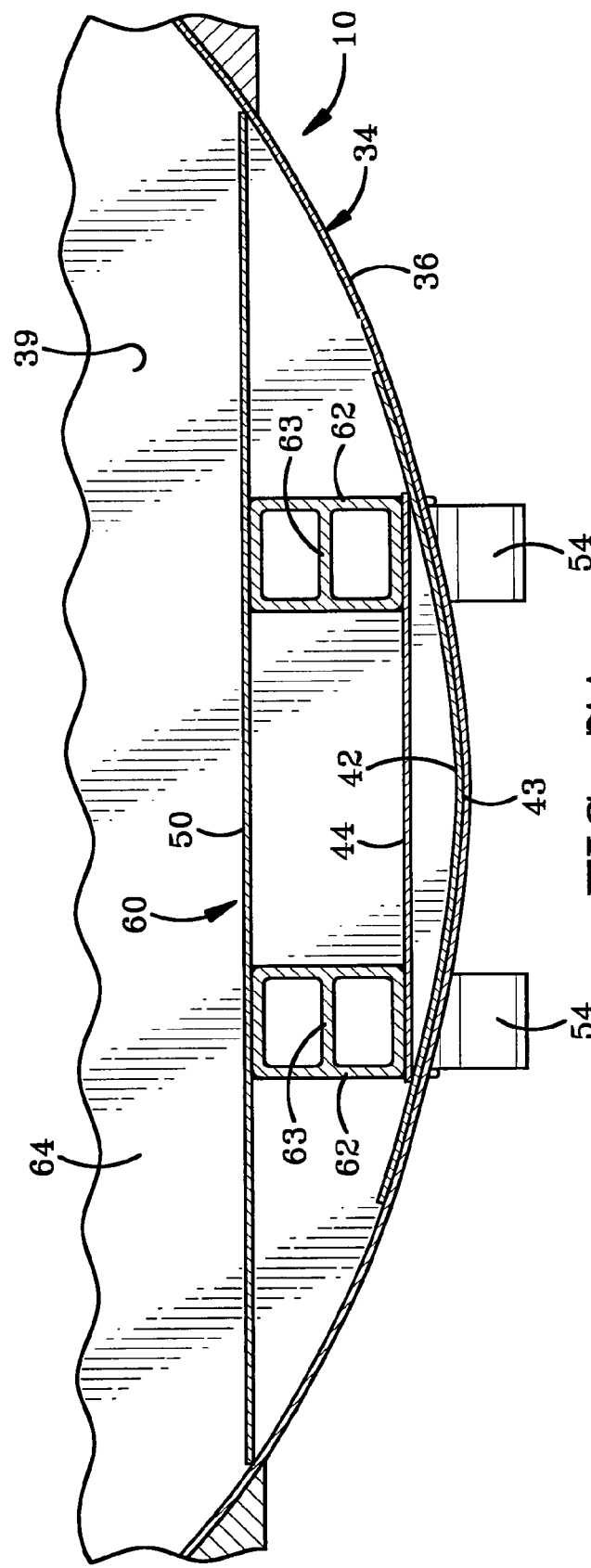

HALF ROUND TRAILER WITH LOWER CENTER OF GRAVITY

CROSS REFERENCE TO RELATED APPLICATIONS

This application claims priority from U.S. Provisional Application Ser. No. 61/133,320 filed Jun. 27, 2008; the disclosure of which is incorporated herein by reference.

BACKGROUND OF THE INVENTION

1. Technical Field

The invention relates generally to an improved semi trailer and trailer coupling system. More particularly, the invention relates to an improved fifth wheel coupling for land use trailers. Specifically, the invention relates to a half round trailer with a fifth wheel coupling formed integral to the trailer to lower the center of gravity and increase trailer stability.

2. Background Information

The trucking industry continues to suffer from substantial increases in overhead due to fuel prices and other expenses. High costs and competition require that all aspects of the truck and trailer be optimized to minimize expenses and utilize all potential productivity. Thus, the industry is constantly in search of improvements that can increase efficiency of the trucks or the trailers in order to reduce operating costs.

The fifth wheel coupling of a tractor-trailer is a key component in the trucking industry as it is the main connection between the truck and the trailer. The fifth wheel receiver is usually mounted above the rear wheels of the truck and is arranged to receive a coupling pin. The coupling pin is located at the front of the trailer and generally extends downward from the bottom side. In operation, the fifth wheel includes an opening at the rear to allow the coupling pin to slide in, where it is then locked in place. This arrangement allows the front end of the trailer to pivot along the horizontal plane with the back of the truck to improve turning and trailer mobility.

The traditional fifth wheel coupling pin is mounted to the exterior of the trailer at the front end and extends downward from the bottom. The pin is secured within a mounting assembly that can withstand the force of the trailer weight when it is fully loaded. Normally, this means that the coupling pin is far below the bottom of the trailer and accordingly increases the overall height of the trailer during operation because it is inserted into the same fifth wheel. The increased height leads to additional wind resistance at the trailer and instability due to the higher center of gravity, both of which decrease fuel efficiency and safety.

The need thus exists for a trailer which has a lower center of gravity and can resist the drag of wind resistance. Additionally, the need exists for a fifth wheel coupling which can be mounted partially within a trailer to reduce the overall height of the front end of the trailer.

SUMMARY OF THE INVENTION

The trailer of the present invention comprises a body having an upper surface and a lower surface, a coupling assembly, and wherein at least a portion of the coupling assembly is disposed between the upper surface and the lower surface. The body further includes a front face having an opening and the coupling assembly extends outward through the opening. The body further comprises an internal cavity having a floor partially formed by an upper portion of the coupling assembly. The coupling assembly further comprises a support assembly disposed between the floor and the lower surface.

The support assembly may be a plurality of beams extending rearward in a horizontal orientation. The plurality of beams may be two sets of beams each set of beams having a first member and a second member secured to one another. The first member may be disposed within the second member. Further, the plurality of beams may be a pair of one-piece beams.

The coupling assembly further comprises a reinforcement plate disposed between the upper surface and the lower surface and proximate the lower surface. The coupling assembly also comprises a distribution plate disposed between the upper surface and the lower surface and proximate the lower surface. Further, the coupling assembly includes at least one support beam disposed between the distribution plate and the upper surface and extending rearward in a horizontal orientation. The coupling assembly further comprises a top plate disposed between the at least one support beam and the upper surface and the top plate extends rearward beyond the at least one support beam to contact the lower surface. The top plate extends at an angle towards the lower surface after extending beyond the back of the at least one support beam, and the angle is substantially the same angle as the angle between the rear portion of the at least one support beam and the lower surface. The coupling assembly may further comprise a mount arranged to receive a kingpin assembly and wherein the mount is generally circular to locate the kingpin assembly.

The trailer of the present invention comprises a body having a cavity formed by an upper surface and a lower surface, a coupling assembly substantially disposed within the cavity and having a reinforcement plate proximate the lower surface, a distribution plate, at lest one support beam, and a top plate, and wherein the distribution plate is disposed atop the reinforcement plate, the at least one support beam is disposed atop the distribution plate, and the top plate is disposed atop the at least one support beam.

BRIEF DESCRIPTION OF THE DRAWINGS

The preferred embodiments of the invention, illustrative of the best modes in which Applicant has contemplated applying the principles of the invention, are set forth in the following description and are shown in the drawings.

FIG. 6 is a sectional view of the preferred embodiment coupling of the half round trailer of FIG. 4 taken generally along line 6-6 of FIG. 3;

FIG. 7 is a sectional view of the preferred embodiment coupling of the half round trailer of FIG. 4 take generally along line 7-7 of FIG. 6;

FIG. 7A is a sectional view of the preferred embodiment coupling of the half round trailer of FIG. 4A take generally along line 7A-7A of FIG. 6A; and, FIG. 8 is a sectional view of the preferred embodiment coupling of the half round trailer taken generally along line 8-8 of FIG. 6.

DESCRIPTION OF THE PREFERRED EMBODIMENTS

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
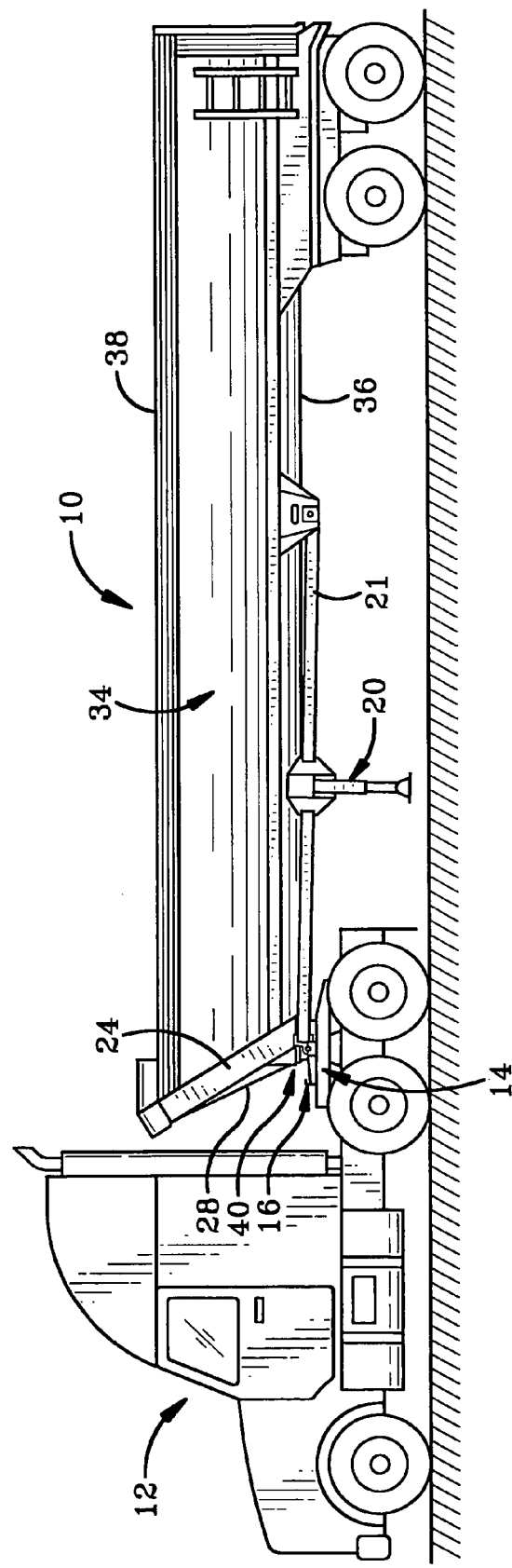
FIG. 1 is a side elevational view of a preferred embodiment half round trailer coupled to a truck.

FIG. 1 is a side elevational view of a preferred embodiment half round trailer 10 coupled to truck 12. Trailer 10 is generally a land use trailer which is hauled by a semi truck and truck 12 supports the front end of trailer 10 at coupling assembly 14. FIG. 1 shows only one side of trailer 10 and truck 12, the other side being substantially identical.

Figure 2:
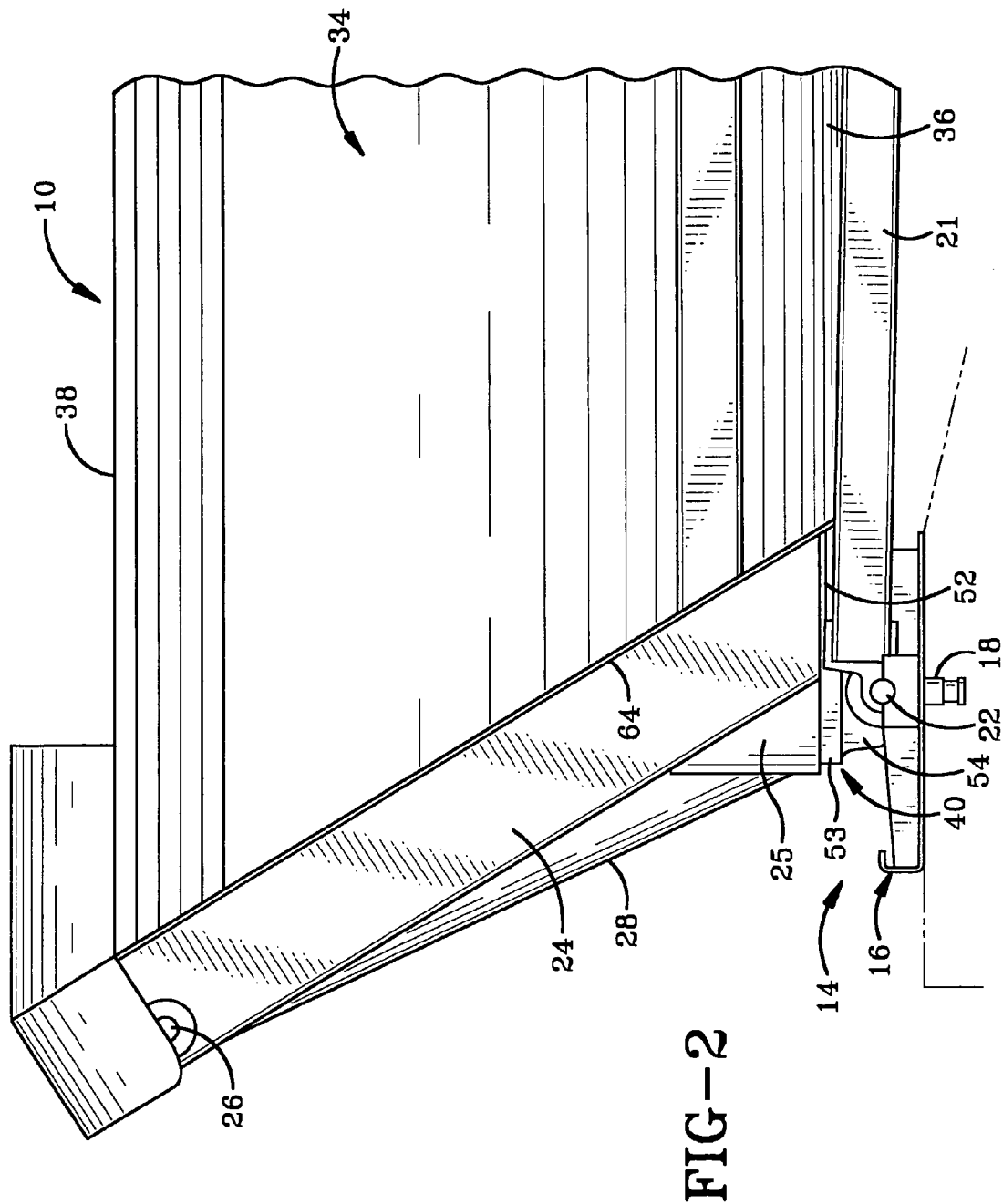
FIG. 2 is a side elevational view of the front of a preferred embodiment half round trailer with a coupling pin extending downward from the bottom of the trailer.
Figure 3:
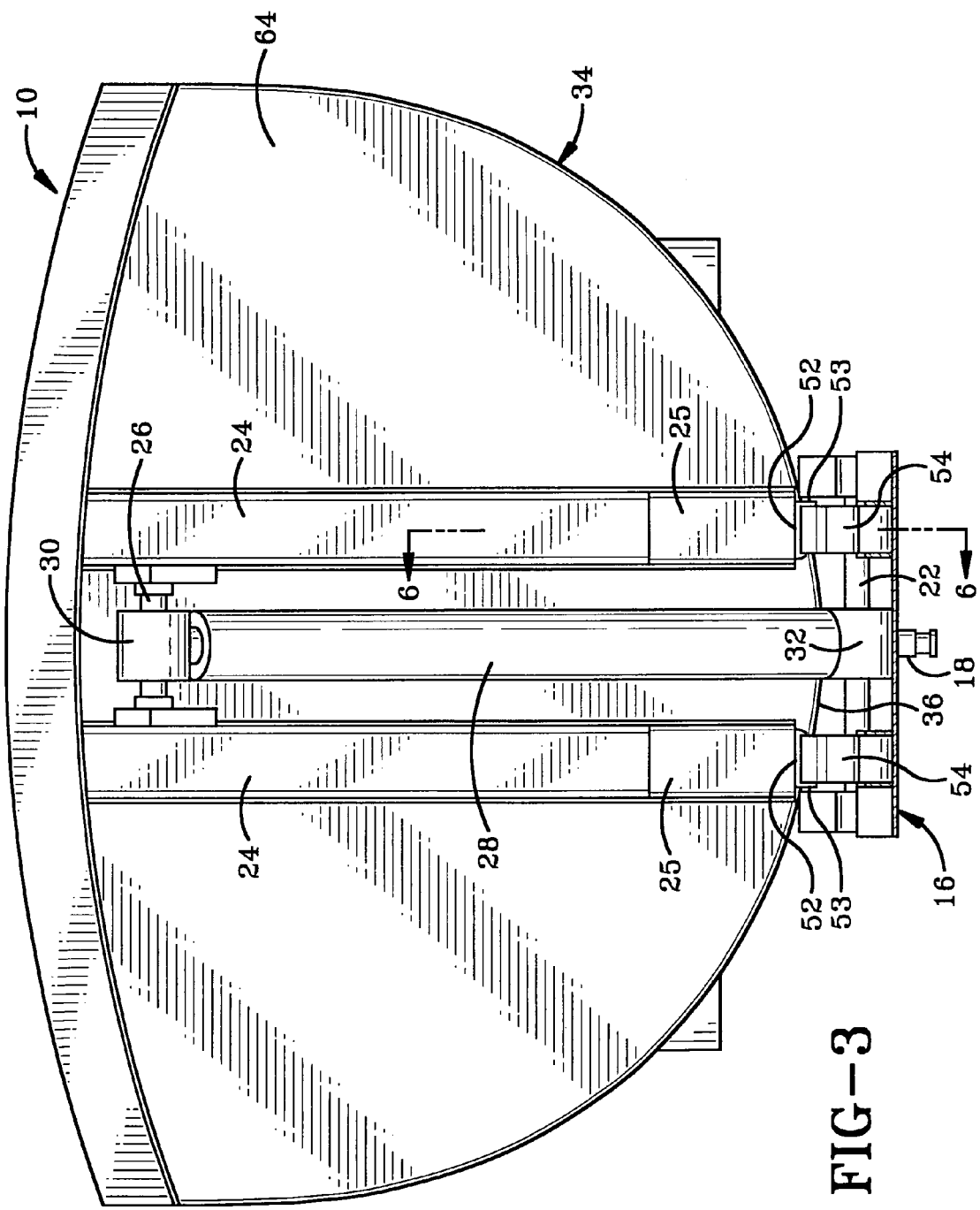
FIG. 3 is a front view of a preferred embodiment half round trailer with a coupling pin extending downward from the bottom of the trailer.

FIGS. 2 and 3 are side and front views, respectively, of the forward portion of trailer 10. The trailer includes kingpin assembly 16 with kingpin 18. Kingpin 18 extends downward from the kingpin assembly and is arranged to slide into a fifth wheel coupling of truck 12, a dolly (not shown), or other suitable towing device. After the kingpin is inserted into the fifth wheel coupling, the kingpin is locked, thereby allowing the trailer to pivot about the kingpin in a horizontal orientation. Landing gear 20 also connects to the front of the trailer 10. In particular, landing gear 20 and kingpin assembly 16 are secured to one another and trailer 10 through pin 22 and beams 21, which traverses the width of trailer 10. Landing gear 20 is used to support the front end of the trailer when it is not coupled to a truck or dolly.

Trailer 10 is manufactured such that a pair of parallel and spaced apart front supports 24 extend up the front side of trailer 10 from the bottom adjacent pin 22 to the top whereby front supports 24 offer rigidity to trailer 10. A triangularly shaped flange or cover 25 is mounted on the front of each support 24 adjacent its lower end. A lower saddle or mount 54 is mounted on the bottom of front support 24. A linear actuator or cylinder 28 is disposed between the front supports and has an upper end 30 which is secured to the front end of trailer 10 at its upper end to pin 26 and to pin 22 at its lower end 32. In operation, cylinder 28 and front supports 24 are extendable to allow the front end of the trailer to be lifted and facilitate removal of the trailer's contents. Trailer 10 also includes body 34 with lower surface 36 and upper surface 38. The upper and lower surfaces form an internal cavity 39 which is capable of safely hauling goods. Lower surface 36 is preferably circular in shape and forms a generally U-shaped cavity. Upper surface 38 is preferably complimentary shaped and may be contoured in shape to decrease wind resistance, be more aesthetically pleasing, and increase the dimensions of the internal cavity.

Figure 4:
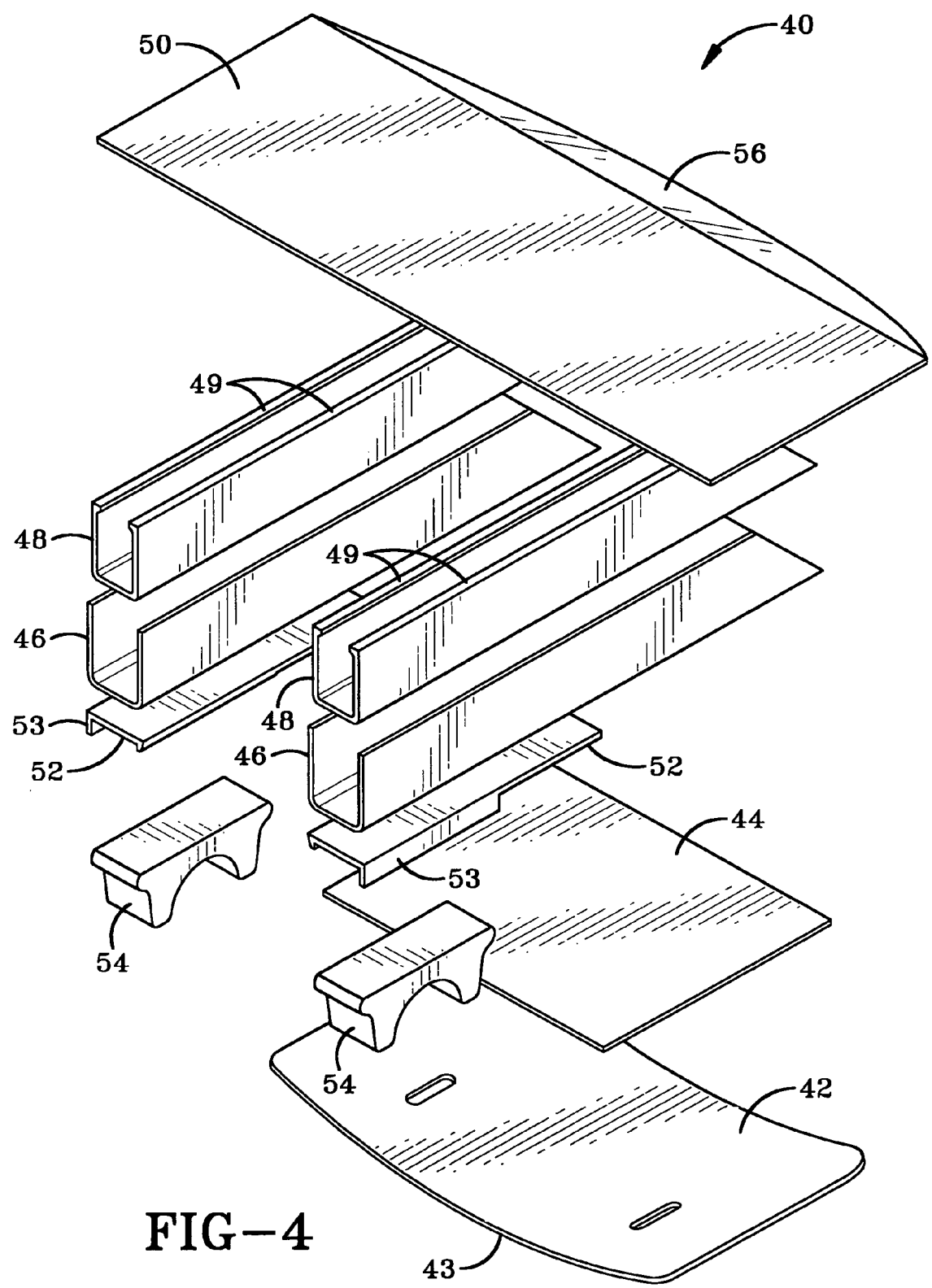
FIG. 4 is an exploded perspective view of a preferred embodiment coupling pin mounting assembly.
Figure 5:
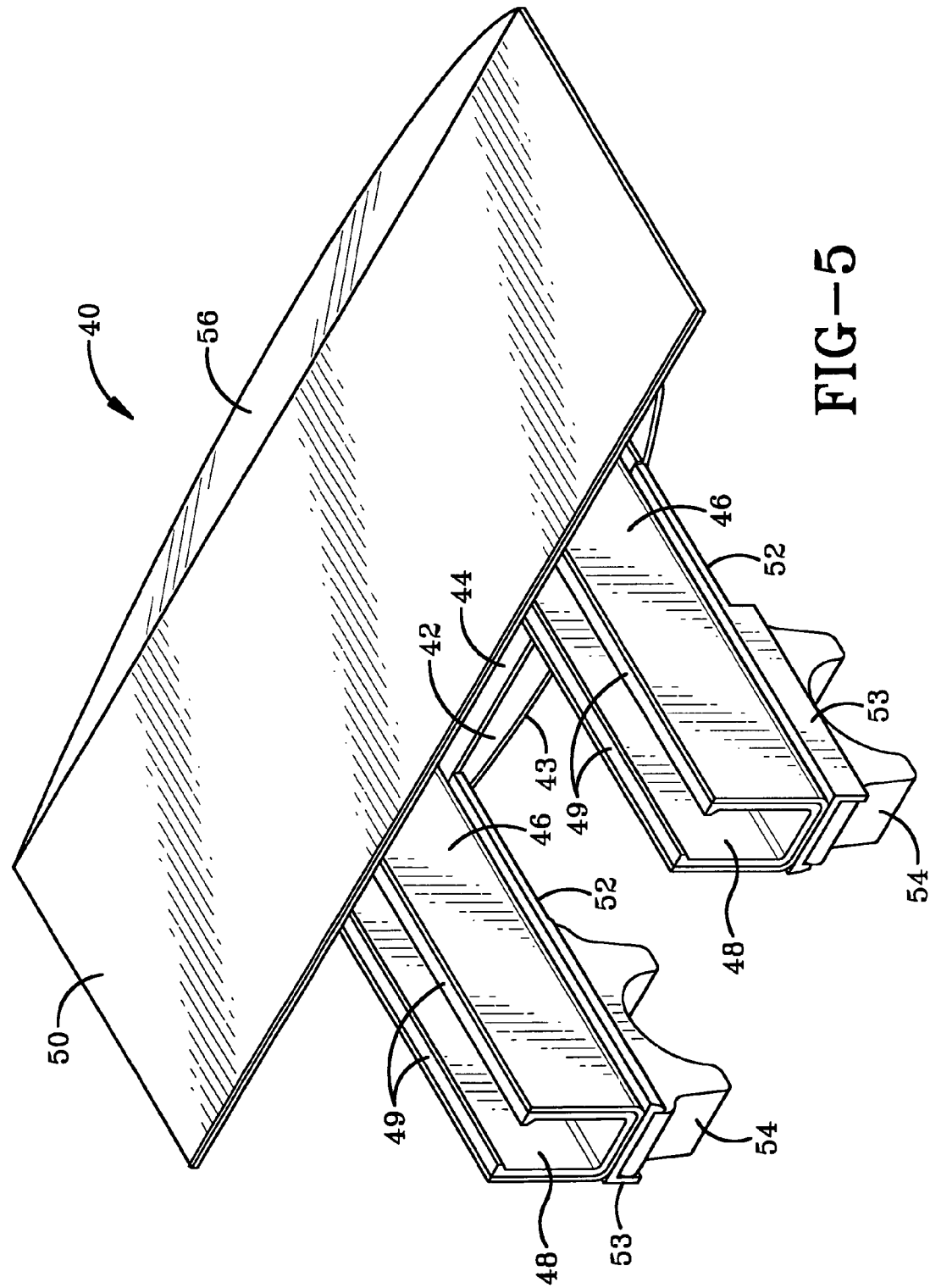
FIG. 5 is a perspective view of the preferred embodiment coupling of FIG. 4 shown assembled.

Averting now to FIGS. 4 and 5, in accordance with one of the main features of the invention, coupling assembly 40 is shown in an exploded view and assembled view, respectively. The coupling assembly includes reinforcement plate 42, distribution plate 44, primary support beams 46, secondary support beams 48, top plate 50, flanges 52, and mounts 54. Reinforcement plate 42 includes a top surface, bottom surface 43, and may be curved to better conform to lower surface 36. Particularly, bottom surface 43 is proximate and rests on lower surface 36. Distribution plate 44 also includes a top surface, a bottom surface, and rests on reinforcement plate 42 and functions to transmit the weight of the front portion of the trailer contents evenly to the reinforcement plate and ultimately to lower surface 34 of the trailer body. The bottom surface of the distribution plate along its side edges is proximate and rests on the top surface of the reinforcement plate 42. A rear portion of flanges 52 abuts the front end of distribution plate 44, while mounts 54 rest below the forward portion of the flanges. Flanges 52 also include alignment walls 53 which locate and prevent rotational movement of the mounts. The mounts 54 may be circular in shape or have a concave circular surface defining a recess to locate and allow rotational movement of the attached components.

In a preferred embodiment, primary support beams 46 and secondary support beams 48 are generally U-shaped consisting of bottom surfaces and side walls extending perpendicularly from each respective bottom surface. Secondary support beams 48 also include upper support ledges 49 extending inward from the top end of the side walls and arranged to support and distribute the weight of the trailer. Secondary support beams 48 are slightly smaller in size than primary support beams 46 so that the secondary support beams can be secured within the primary support beams. While the preferred embodiment is shown and described with a pair of U-shaped support beams, one of ordinary skill in the art should immediately recognize that the pair of U-shaped beams could be combined into a single beam or be composed of a different shape, such as a rectangular or circular tube, which is within the spirit and scope of the invention as claimed.

Further, the rear portion of the support beams may have an angle to reduce the amount of interior space they take up within the trailer cavity. However, the support beams need not include an angled portion and may vary in length, as well as the support beam arrangement and/or support beam combinations so long as they can support the trailer weight, which is within the spirit and scope of the invention as claimed.

Top plate 50 includes a bottom surface which is located atop primary support beams 46 and secondary support beams 48. The top plate may further include an angled portion 56 which matches the angle of the support beams (if applicable). Advantageously, top plate 50 functions to transmit the weight of any goods located on it to the support beams. Further, when top plate 50 is installed, the top plate includes an upper surface which creates a portion of the floor for the internal cavity of the trailer and also hides the coupling assembly from inside the trailer cavity, thus creating an aesthetically pleasing internal trailer cavity as well as lowering the trailer center of gravity.

Figure 4A:
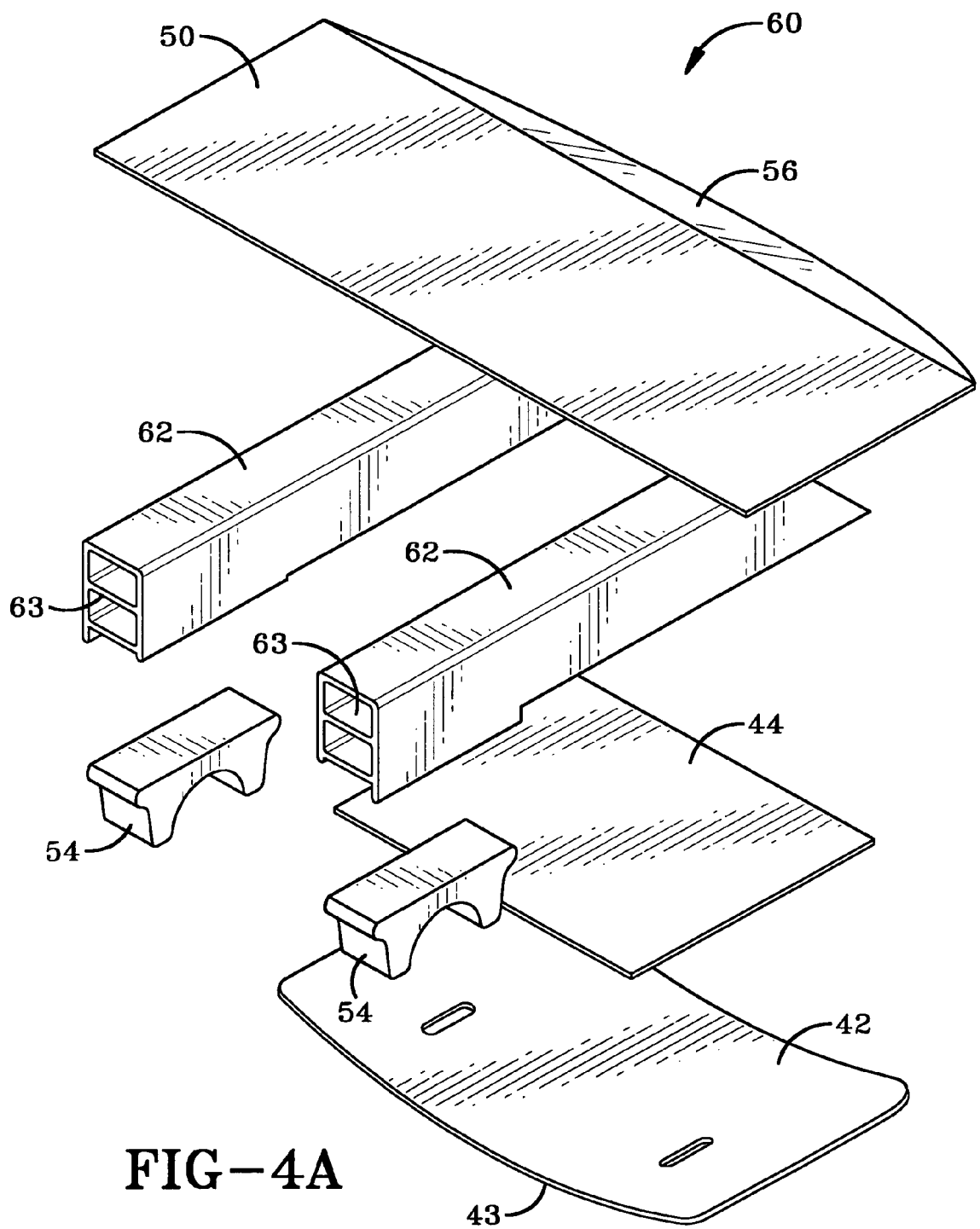
FIG. 4A is an exploded perspective view of another preferred embodiment coupling pin mounting assembly.
Figure 5A:
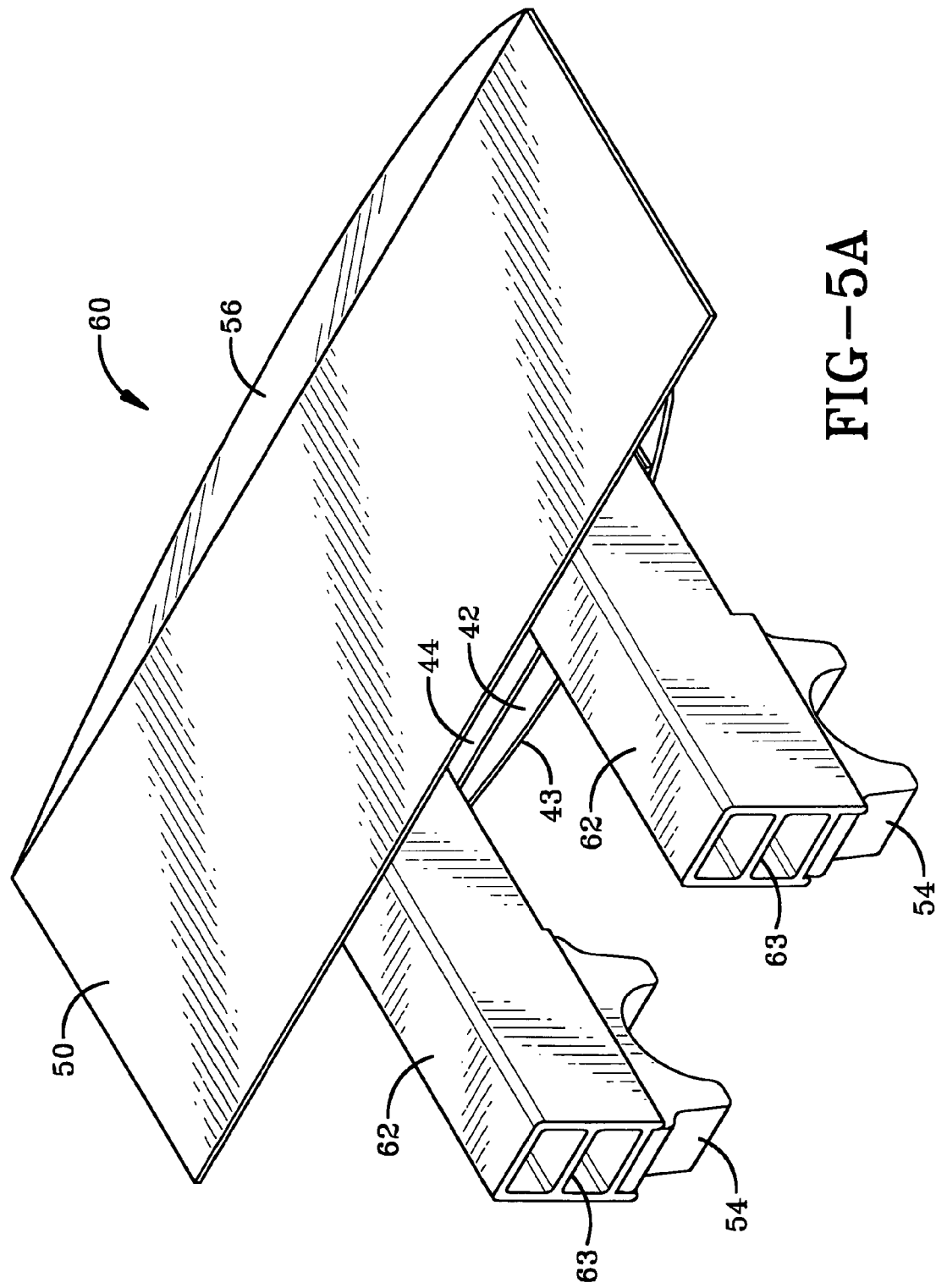
FIG. 5A is a perspective view of the preferred embodiment coupling of FIG. 4A shown assembled.

Averting now to FIGS. 4A and 5A, another preferred embodiment coupling assembly 60 is shown in an exploded view and assembled view, respectively. Coupling assembly 60 is substantially the same as coupling assembly 40, but replaces primary support beams 46 and secondary support beams 48 with support beams 62 and incorporates flanges 52 directly on support beams 62. Support beams 62 are preferably a single piece, which can be formed by extrusion or any other suitable production method. In the preferred embodiment, support beams 62 are generally square tube shaped and includes central support piece 63 parellel to the top and bottom walls of support beams 62. Since the remaining components of the second preferred embodiment coupling assembly are identical and both embodiments function identically, it is not necessary to repeat the arrangement or function of coupling assembly 60 and the corresponding components.

Figure 6A:
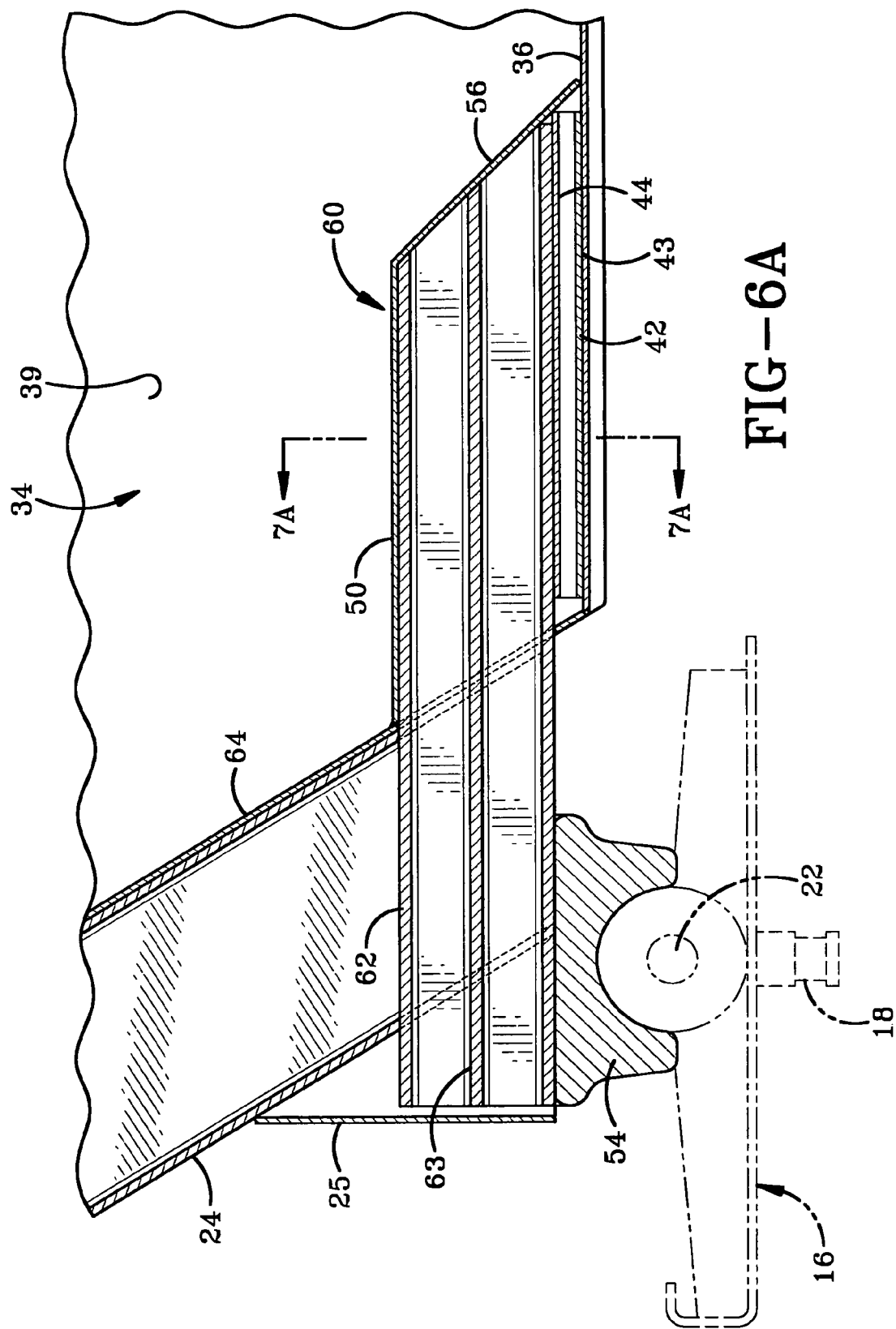
FIG. 6A is a sectional view of the preferred embodiment coupling of the half round trailer of FIG. 4A taken generally along line 6-6 of FIG. 3.

FIGS. 6 and 6A are sectional views of the first preferred embodiment coupling located within a half round trailer and the second preferred embodiment coupling located within a half round trailer, respectively. As described supra, the function and arrangement of the two embodiments are identical, as such only coupling assembly 40 of FIG. 6 will be described, but is equally applicable to coupling assembly 60 of FIG. 6A.

Coupling assembly 40 is shown within the internal cavity of the trailer and is partially enclosed within trailer front wall 64 and trailer lower surface 36. Preferably, an opening of approximately the same height and width of support beams 46 and 48 and flanges 52 enables those components to extend out of the trailer body. Accordingly, since some of the components extend out of the trailer body, the height of the trailer is reduced without reducing the integrity of the trailer floor. Further, reinforcement plate 42 and distribution plate 44 are preferably located wholly within the trailer and proximate lower surface 36 to provide complimentary support and distribution of the trailer weight. Front supports 24 also run the exterior height of front wall 64. Advantageously, top plate 50 and angled portion 56 form the bottom front portion of the trailer interior cavity and allow the space within the trailer that is above the coupling assembly to be used for transporting goods.

As can be seen in FIG. 6, coupling assembly 40 is substantially located above lower surface 36. Advantageously, the support beams, the distribution plate, and the reinforcement plate are all located above lower surface 36. Accordingly, the overall height of the trailer is reduced by the height of the coupling assembly. Since the coupling assembly is located further upward in the trailer, the height from the coupling assembly to the top of the trailer is reduced and the height of the upper surface of the trailer is also reduced by the height of the coupling assembly. Finally, since the trailer height is reduced, wind resistance is reduced and the center of gravity is lowered, thereby increasing both fuel efficiency and safety.

FIGS. 7 and 7A are sectional views of the first preferred embodiment and second preferred embodiment, respectively, facing the front wall. Similar to FIGS. 6 and 6A, top plate 50 is the floor of the internal cavity and rests on primary support beam 46 and secondary support beam 48 in the first embodiment and support beams 62 in the second embodiment. The respective support beams rest on distribution plate 44, which in turn rests on reinforcement plate 42. Further, top plate 50 may be square or rectangular as shown, or may be generally concave and complimentarily shaped to lower surface 36.

FIG. 8 is a sectional view of a preferred embodiment half round trailer facing front wall 64. Angled portion 56 follows the angle of the support beams and forms a ramp on the floor of the internal cavity. Angled portion 56 is complimentary shaped to lower surface 36 and is generally semi-circular in shape.

While the support beams are shown as generally rectangular beams, it is within the spirit and scope of the invention to utilize any support structure which is capable of withstanding the forces of the trailer weight and still allow the trailer to be coupled to a truck. Further, while the present invention has been shown and described as integral to a half round trailer, it is within the spirit and scope of the present invention as claimed to incorporate the coupling assembly arrangement within any suitable trailer.

Accordingly, the half round trailer is an effective, safe, inexpensive, and efficient device that achieves all the enumerated objectives of the invention, provides for eliminating difficulties encountered with prior art devices, systems, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the trailer is constructed and used, the characteristics of the construction, and the advantageous new and useful results obtained; the new and useful structures, devices, elements, arrangement, parts, combinations, and methods are set forth in the appended claims.

What is claimed is:

1. A trailer comprising:
    a body having a front end, a back end, an upper surface, a lower surface which is generally parallel to the upper surface and extends from the front end to the back end, a top wall defining the upper surface, a bottom wall defining the lower surface, a front wall adjacent the front end extending from the top wall to the bottom wall, and a back wall adjacent the back end extending from the top wall to the bottom wall so that the walls together define an internal cavity;
    a plurality of wheels mounted on and extending downwardly of the body proximate the back end;
    a coupling assembly which is mounted on the body adjacent the front end and is adapted to be selectively connected to a towing vehicle; and
    a first support beam of the coupling assembly having front and back ends between which the beam is elongated; wherein the first support beam extends through the front wall adjacent and above the bottom wall with the back end of the beam within the internal cavity and the front end of the beam forward of the front wall and external to the internal cavity.

2. The trailer of claim 1 wherein the coupling assembly further comprises a reinforcement plate which is within the internal cavity and rests on the bottom wall directly below the first support beam.

3. The trailer of claim 2 wherein the bottom wall is curved as viewed from the front end; and the reinforcing plate is curved as viewed from the front end so that the reinforcing plate conforms to the bottom wall; the coupling assembly further comprises a horizontal distribution plate which is within the internal cavity and rests on the curved reinforcing plate; and the first support beam rests on the horizontal distribution plate.

4. The trailer of claim 3 wherein the coupling assembly further comprises a second support beam having front and back ends between which the second support beam is elongated; wherein the second support beam extends through the front wall adjacent and above the bottom wall with the back end of the second support beam within the internal cavity and the front end of the second support beam forward of the front wall and external to the internal cavity; the second support beam is spaced apart from the first support beam; and the second support beam rests on the horizontal distribution plate.

5. The trailer of claim 4 wherein the coupling assembly further comprises a top plate which is within the internal cavity and has a horizontal portion which rests on the first and second support beams.

6. The trailer of claim 5 wherein the top plate comprises an angled portion which angles downwardly and rearwardly beyond the back ends of the support beams and contacts the bottom wall rearwardly of the back ends of the support beams.

7. The trailer of claim 6 wherein the angled portion has a curved lower edge which rests on and conforms to the curved bottom wall.

8. The trailer of claim 1 further comprising a kingpin assembly;
and a kingpin which extends downwardly from the kingpin assembly and is adapted to couple with a towing vehicle coupling assembly of the towing vehicle; wherein the kingpin assembly is mounted on the first support beam at a location forward of the front wall external to the internal cavity and extends downwardly therefrom.

9. The trailer of claim 8 further comprising an actuator which is secured to the front end of the trailer body and to the kingpin assembly; and wherein the actuator is extendable to lift the front end of the body.

10. The trailer of claim 8 further comprising a pair of generally horizontal beams secured to the kingpin assembly and extending rearwardly therefrom; and landing gear secured to and extending downwardly from the beams for supporting the front end of the body when not coupled to the towing vehicle.

11. A trailer comprising:
a body having front and back ends and comprising a front wall adjacent the front end, a back wall adjacent the back end, a top wall, a bottom wall and a pair of opposed side walls which together define therewithin an internal cavity;
a plurality of wheels mounted on and extending downwardly of the body proximate the back end;
a through opening formed in the front wall adjacent and higher than the bottom wall:
a trailer coupling assembly secured to the body;
a first portion of the trailer coupling assembly disposed within the cavity adjacent the bottom wall and front end of the trailer body and extending forward through the through opening; and
a second portion of the trailer coupling assembly secured to the first portion and extending forward from adjacent the through opening external to the cavity and adapted for coupling the trailer to a towing vehicle.

12. The trailer of claim 11 wherein the first portion rests on the bottom wall.

13. The trailer of claim 12 wherein the first portion comprises a reinforcing plate which rests on the bottom wall.

14. The trailer of claim 11 wherein the bottom wall is curved as viewed from the front end; and the reinforcing plate is curved as viewed from the front end so that the reinforcing plate conforms to the bottom wall.

15. The trailer of claim 11 wherein the first portion comprises a generally horizontal plate which is spaced upwardly of the bottom wall.

16. The trailer of claim 15 wherein each of the bottom wall and the generally horizontal plate serve as part of a floor of the internal cavity.

17. The trailer of claim 11 further comprising a kingpin assembly; and a kingpin which extends downwardly from the kingpin assembly and is adapted to couple with a towing vehicle coupling assembly of the towing vehicle; wherein the kingpin assembly is mounted on the second portion at a location forward of the front wall external to the internal cavity and extends downwardly therefrom.

18. The trailer of claim 17 further comprising an actuator which is secured to the front end of the trailer body and to the kingpin assembly; and wherein the actuator is extendable to lift the front end of the body.

19. The trailer of claim 17 further comprising a pair of generally horizontal beams secured to the kingpin assembly and extending rearwardly therefrom; and landing gear secured to and extending downwardly from the beams for supporting the front end of the body when not coupled to the towing vehicle.

20. The trailer of claim 1 wherein the trailer is a half round trailer; the bottom wall is curved as viewed from the front; and the front wall has a generally semi-circular shape.

21. The trailer of claim 1 further comprising a first front support having upper and lower ends between which the first front support is elongated; wherein the first front support is secured to the front wall and extends forward therefrom external to the internal cavity with the upper end of the first front support adjacent the top wall and the lower end of the first front support adjacent the bottom wall so that the first front support extends upwardly from the first support beam.

22. The trailer of claim 1 further comprising first and second parallel and spaced apart front supports which are secured to the front wall external to the internal cavity and which extend from adjacent the bottom wall to adjacent the top wall; and a second support beam of the coupling assembly having front and back ends between which the second support beam is elongated; wherein the second support beam extends through the front wall adjacent and above the bottom wall with the back end of the second support beam within the internal cavity and the front end of the second support beam forward of the front wall and external to the internal cavity; the second support beam is spaced apart from the first support beam; and the first and second front supports extend respectively upwardly from the first and second support beams.

23. The trailer of claim 22 further comprising a pin mounted on and extending between the first and second front supports; and an actuator having an upper end secured to the pin; wherein the actuator is extendable to lift the front end of the body of the trailer.

24. The trailer of claim 4 wherein the horizontal distribution plate has first and second opposed side edges; the distribution plate rests on the curved reinforcement plate along the first and second side edges; and the first and second support beams rest on the horizontal distribution plate respectively along the first and second opposed edges.

25. The trailer of claim 4 further comprising first and second parallel and spaced apart front supports which are secured to the front wall external to the internal cavity, which extend from adjacent the bottom wall to adjacent the top wall and which extend respectively upwardly from the first and second support beams.

26. The trailer of claim 11 wherein the trailer is a half round trailer; the bottom wall is curved as viewed from the front; and the front wall has a generally semi-circular shape.

27. The trailer of claim 14 wherein the first portion comprises a horizontal distribution plate which rests on the curved reinforcing plate.

28. The trailer of claim 27 wherein the coupling assembly comprises a first support beam having front and back ends between which the first support beam is elongated; wherein the first support beam is adjacent and above the bottom wall with the back end of the first support beam within the internal cavity and the front end of the first support beam forward of the front wall and external to the internal cavity; and the first support beam rests on the horizontal distribution plate.

29. The trailer of claim 28 wherein the coupling assembly comprises a second support beam having front and back ends between which the second support beam is elongated; wherein the second support beam is adjacent and above the bottom wall with the back end of the second support beam within the internal cavity and the front end of the second support beam forward of the front wall and external to the internal cavity; the second support beam is spaced apart from the first support beam; and the second support beam rests on the horizontal distribution plate.

30. The trailer of claim 29 wherein the coupling assembly further comprises a top plate which is within the internal cavity and has a horizontal portion which rests on the first and second support beams and serves as part of a floor of the internal cavity.

31. The trailer of claim 29 wherein the horizontal distribution plate has first and second opposed side edges; the distribution plate rests on the curved reinforcement plate along the first and second side edges; and the first and second support beams rest on the horizontal distribution plate respectively along the first and second opposed edges.

* * * * *

UNITED STATES PATENT AND TRADEMARK OFFICE
CERTIFICATE OF CORRECTION

PATENT NO.        : 8,376,385 B2
APPLICATION NO.   : 12/229300
DATED             : February 19, 2013
INVENTOR(S)       : Danny R. Shannon Page 1 of 1

It is certified that error appears in the above-identified patent and that said Letters Patent is hereby corrected as shown below:

In the Claims

Column 7, line 56 (Claim 14) "The trailer of claim 11" should be changed to --The trailer of claim 13--

Signed and Sealed this
Fourth Day of June, 2013

Teresa Stanek Rea
*Acting Director of the United States Patent and Trademark Office*